US010056046B2

(12) United States Patent
Matsumoto

(10) Patent No.: US 10,056,046 B2
(45) Date of Patent: Aug. 21, 2018

(54) ELECTROPHORETIC DISPLAY APPARATUS AND ELECTRONIC DEVICE

(71) Applicant: Seiko Epson Corporation, Tokyo (JP)

(72) Inventor: Akihito Matsumoto, Chino (JP)

(73) Assignee: Seiko Epson Corporation, Tokyo (JP)

( * ) Notice: Subject to any disclaimer, the term of this patent is extended or adjusted under 35 U.S.C. 154(b) by 336 days.

(21) Appl. No.: 14/847,131

(22) Filed: Sep. 8, 2015

(65) Prior Publication Data

US 2016/0117976 A1 Apr. 28, 2016

(30) Foreign Application Priority Data

Oct. 23, 2014 (JP) ................................ 2014-216698

(51) Int. Cl.
*G06F 3/038* (2013.01)
*G09G 3/34* (2006.01)

(52) U.S. Cl.
CPC ..... *G09G 3/344* (2013.01); *G09G 2310/0248* (2013.01); *G09G 2310/0267* (2013.01); *G09G 2320/0223* (2013.01); *G09G 2330/021* (2013.01)

(58) Field of Classification Search
CPC ................ G09G 3/344; G09G 3/3446; G09G 2310/0248; G09G 2310/0267; G09G 2320/0223; G09G 2330/021; G02F 1/167
See application file for complete search history.

(56) References Cited

U.S. PATENT DOCUMENTS

| | | | | |
|---|---|---|---|---|
| 5,903,234 A | 5/1999 | Kimura | | |
| 6,181,314 B1 | 1/2001 | Nakajima et al. | | |
| 6,307,681 B1 * | 10/2001 | Aoki | G09G 3/3648 | 340/14.1 |
| 8,237,653 B2 | 8/2012 | Maeda et al. | | |
| 2001/0033261 A1 * | 10/2001 | Washio | G09G 3/3685 | 345/87 |
| 2002/0000970 A1 * | 1/2002 | Akimoto | G09G 3/3648 | 345/100 |

(Continued)

FOREIGN PATENT DOCUMENTS

| | | |
|---|---|---|
| JP | 10-11032 A | 1/1998 |
| JP | 11-73163 A | 3/1999 |

(Continued)

*Primary Examiner* — Amare Mengistu
*Assistant Examiner* — Crystal A Mathews
(74) *Attorney, Agent, or Firm* — ALG Intellectual Property, LLC

(57) ABSTRACT

An electrophoretic display apparatus includes a data line charging circuit; an adjustment resistance; a first switching portion that cause a first data line end portion of the data line to be electrically connected to any one of a data line driving circuit and the adjustment resistance; a second switching portion that cause a second data line end portion of the data line to be electrically connected to or disconnected from the data line charging circuit; and a control portion that perform control such that the first switching portion causes the first data line end portion of the data line to be electrically connected to the adjustment resistance, and subsequently allow starting of a precharge operation by performing control such that the second switching portion causes the second data line end portion of the data line to be electrically connected to the data line charging circuit.

10 Claims, 9 Drawing Sheets

(56) References Cited

U.S. PATENT DOCUMENTS

| | | | | |
|---|---|---|---|---|
| 2003/0016202 | A1* | 1/2003 | Edwards | G09G 3/2011 345/98 |
| 2003/0156101 | A1* | 8/2003 | LeChevalier | G09G 3/3216 345/204 |
| 2003/0214470 | A1* | 11/2003 | Sun | G09G 3/3655 345/87 |
| 2005/0122321 | A1* | 6/2005 | Akai | G09G 3/3688 345/204 |
| 2005/0156820 | A1* | 7/2005 | Aoki | G09G 3/3648 345/58 |
| 2006/0125759 | A1* | 6/2006 | An | G09G 3/3688 345/98 |
| 2008/0100603 | A1 | 5/2008 | Matsuda et al. | |
| 2008/0219070 | A1* | 9/2008 | Akiyama | G11C 29/08 365/201 |
| 2011/0141087 | A1* | 6/2011 | Hiji | G09G 3/3446 345/211 |
| 2017/0176837 | A1* | 6/2017 | Matsumoto | G02F 1/167 |

FOREIGN PATENT DOCUMENTS

| | | | |
|---|---|---|---|
| JP | 11-85115 | A | 3/1999 |
| JP | 2004-191536 | A | 7/2004 |
| JP | 2004-191544 | A | 7/2004 |
| JP | 2006-71940 | A | 3/2006 |
| JP | 2006-349873 | A | 12/2006 |
| JP | 2008-116556 | A | 5/2008 |
| JP | 2008-268853 | A | 11/2008 |
| JP | 2008-304566 | A | 12/2008 |

* cited by examiner

ELECTROPHORETIC DISPLAY APPARATUS AND ELECTRONIC DEVICE

BACKGROUND

1. Technical Field

The present invention relates to an electrophoretic display apparatus and an electronic device.

2. Related Art

It has been well known that, when an electric field is applied to a dispersion system in which fine particles are dispersed in a liquid, the fine particles are moved (electrophoresed) in the liquid by a Coulomb force. This phenomenon is called an electrophoretic migration and, recently, various electrophoretic display apparatuses that utilize this electrophoretic migration and thereby enable display of desired information (images) thereon have been in widespread common use.

For example, in JP-A-2008-268853, there is disclosed an electrophoretic display apparatus including a pixel electrode; an opposite electrode; and a microcapsule type electrophoretic element provided with microcapsules disposed between the pixel electrode and the opposite electrode. In each of the microcapsules, a dispersion solvent for dispersing electrophoretic particles inside the microcapsule; a plurality of white particles; and a plurality of black particles are encapsulated. The pixel electrode is electrically connected to a data line for supplying a data signal, and this data signal is written into the pixel electrode via the data line.

Meanwhile, there exists a wiring capacitance on the data line. Thus, when the data signal is written into the pixel electrode via the data line, the wiring capacitance is also charged. Further, there also exists a wiring resistance on the data line. Thus, when the data signal is written into the pixel electrode via the data line, a voltage drop occurs due to the wiring resistance.

Further, the charging of the wiring capacitance and the voltage drop due to the wiring resistance result in the increase of a time required to complete the writing of the data signal into the pixel electrode. Moreover, since the more the length of the data line increases, the more the wiring capacitance and the wiring resistance increase, the farther from a data line driving circuit, which is a supply source of a data signal, a pixel electrode is located, the larger a time required to complete writing of the data signal into the pixel electrode becomes, and, as a result, power consumption of the data line driving circuit also increases.

SUMMARY

An advantage of some aspects of the invention is that an electrophoretic display apparatus is provided, which enables realization of shortening a time required to complete writing of a data signal into a pixel electrode as well as reducing power consumption of a data line driving circuit provided therein.

An electrophoretic display apparatus according to an aspect of the invention includes a scanning line; a data line intersecting with the scanning lines; a pixel which is provided so as to correspond to an intersection of the scanning line and the data line, and includes a first electrode and a second electrode that interpose electrophoretic particle therebetween; a data line driving circuit that output a data signal onto the data line; a precharge circuit that set an electric potential of the data line to a pre-charge electric potential; a precharge electric potential adjustment portion that adjust a value of the precharge electric potential; a first switching portion that cause a first data line end portion of the data line to be electrically connected to any one of the data line driving circuit and the precharge electric potential adjustment portion; a second switching portion that cause a second data line end portion of the data line to be electrically connected to or disconnected from the precharge circuit; and a control portion that perform control such that the first switching portion causes the first data line end portion of the each data line to be electrically connected to the precharge electric potential adjustment portion, and subsequently allows starting of a precharge operation by performing control such that the second switching portion causes the second data line end portion of the each data line to be electrically connected to the precharge circuit.

According to this aspect of the invention, during a precharge period prior to a period when the relevant data line is supplied with a data signal, the first data line end portion of the relevant data line is electrically connected to the precharge electric potential adjustment portion; the second data line end portion of the relevant data line is electrically connected to the precharge circuit; and in this connection state, an electric potential of the relevant data line is set to a precharge electric potential. Through this operation, the data signal is supplied to the relevant data line that is in a state of having been charged up to the precharge electric potential, and thus, a time required to complete writing of the data signal into a corresponding pixel is shortened and, as a result, power consumption of the data line driving circuit is reduced. Further, the value of the precharge electric potential becomes more stable, as compared with a case where, during the precharge period, the first data line end portion of the relevant data line is open. Moreover, the relevant data line is electrically disconnected from the data line driving circuit by the first switching portion before being electrically connected to the precharge circuit, and thus, it is possible to prevent the flow of a so-called penetration current into the data line driving circuit during the precharge period.

In the electrophoretic display apparatus according to the aspect of the invention, the precharge electric potential adjustment portion include a resistance, one of ends of the resistance being electrically connected to the first switching portion, the other one of the ends of the resistance being kept to a fixed electric potential.

In this case, during the precharge period, the first data line end portion of the relevant data line is electrically connected to the one of the ends of the resistance via the first switching portion. The other one of the ends of the resistance is kept to the fixed electric portion. Through this configuration, the value of the precharge electric potential becomes more stable, as compared with a case where, during the precharge period, the first data line end portion of the relevant data line is open.

In the electrophoretic display apparatus, the resistance includes at least one active element set each including a P-type transistor set including a plurality of P-type transistors that are mutually electrically connected in series and an N-type transistor set including a plurality of N-type transistors that are mutually electrically connected in series, a total number of the P-type transistors and a total number of the N-type transistors being the same and being larger than or equal to two, the P-type transistor set and the N-type transistor set being electrically connected in parallel to each other.

In this case, it is possible to reduce the area of a region that is related to the resistance and that is a region targeted for patterning therefor, by constituting the resistance by using the at least one active element set each including the transistors that are active elements. Further, it is possible to change the value of the resistance by switching ON or OFF state of the transistors.

In the electrophoretic display apparatus, further includes a resistance value changing portion that changes an electric resistance value of the resistance.

In this case, it becomes possible to change the electric resistance value of the resistance by using the resistance value changing portion.

An electronic device according to another aspect of the invention includes the electrophoretic display apparatus according to the aspect of the invention.

According to this aspect of the invention, an electronic device that brings about the similar advantageous effects as those of the electrophoretic display apparatus according to the aspect of the invention is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described.

Figure 1:
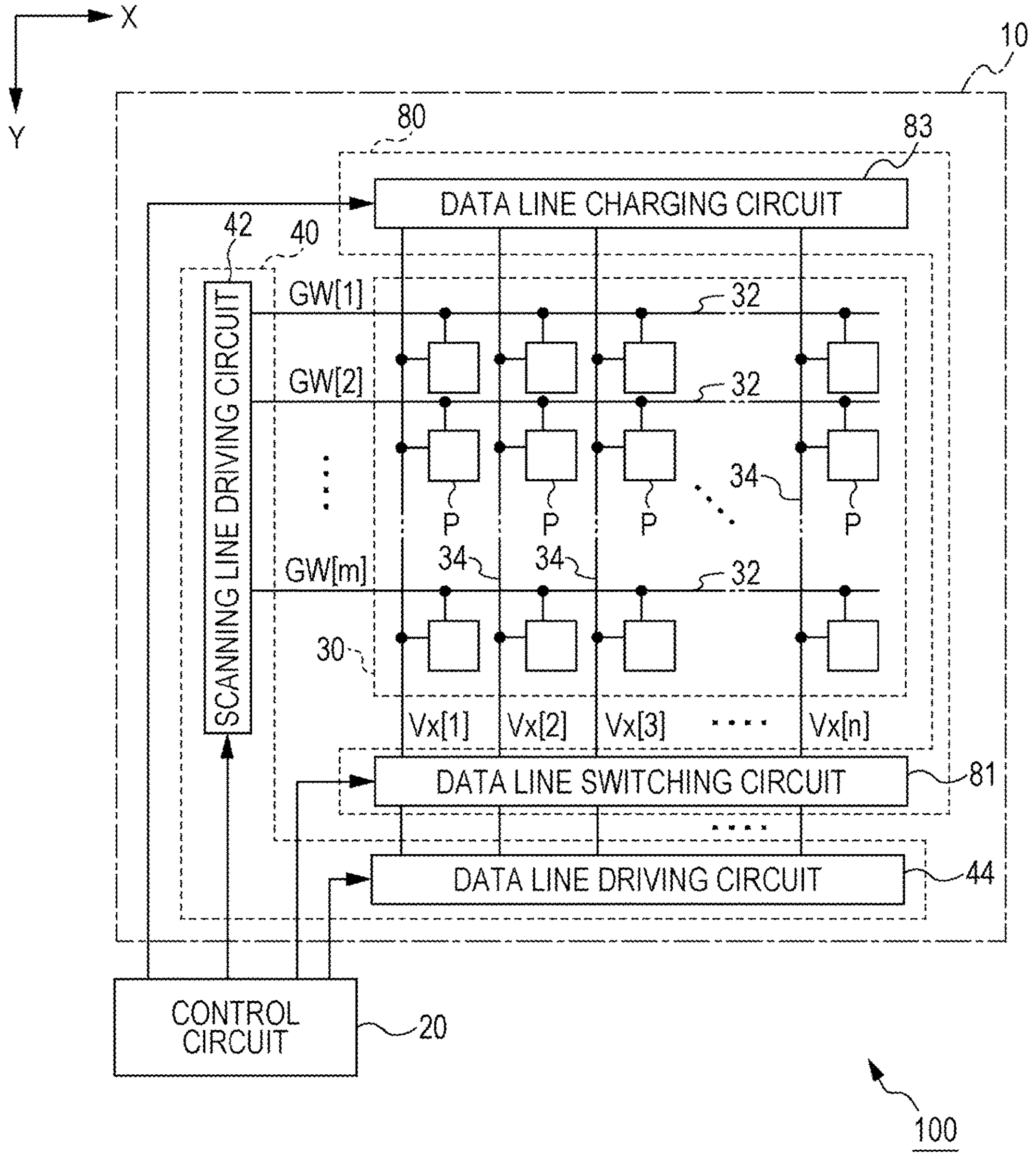
FIG. 1 is a block diagram illustrating a main configuration of an electrophoretic display apparatus according to an embodiment of the invention.

Referring to FIG. 1, which is a block diagram illustrating the main configuration of an electrophoretic display apparatus 100 according to an embodiment of the invention, the electrophoretic display apparatus 100 includes an electrophoretic panel 10 and a control circuit 20.

This electrophoretic panel 10 includes a display area 30 on which a plurality of pixel circuits P are arrayed; a driving portion 40 for driving the individual pixel circuits P; and a charging switching portion 80. This driving portion 40 includes a scanning line driving circuit 42 and a data line driving circuit 44.

The control circuit 20 performs overall control of individual portions of the electrophoretic panel 10 on the basis of a video signal, synchronization signals, and the like, that are supplied from an upper apparatus.

On the display area 30, there are formed m scanning lines 32 extending in an X direction, and n data lines 34 extending in a Y direction and intersecting with the scanning lines 32 (m and n being natural numbers). The plurality of pixel circuits P are each disposed so as to correspond to an intersection of one of the scanning lines 32 and one of the data lines 34, and are arrayed in a matrix shape consisting of m rows that are arranged in a vertical direction and n columns that are arranged in a horizontal direction.

Figure 2:
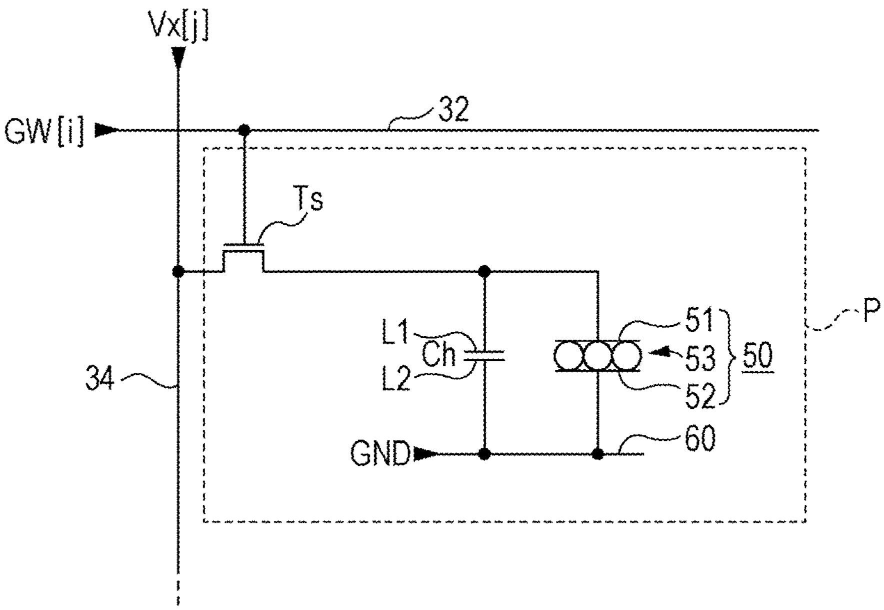
FIG. 2 is a diagram illustrating an example of the configuration of a pixel circuit according to an embodiment of the invention.

FIG. 2 is a diagram illustrating an example of the configuration of the pixel circuit P. FIG. 2 illustrates a single pixel circuit P that is located at a position corresponding to an intersection of an i-th row ($1 \le i \le m$) and a j-th column ($1 \le j \le n$). As shown in FIG. 2, the pixel circuit P includes an electrophoretic element 50; a selecting switch Ts; and a storage capacitor Ch. This electrophoretic element 50 includes a pixel electrode 51 and an opposite electrode 52 that face each other, and a plurality of microcapsules 53 that are disposed between the pixel electrode 51 and the opposite electrode 52. In this embodiment, the opposite electrode 52 is a viewing side electrode.

Each of the microcapsules 53 is a spherical material that encapsulates therein a solvent for dispersing electrophoretic particles (i.e., a dispersion solvent); a plurality of white particles (i.e., white electrophoretic particles); and a plurality of black particles (i.e., black electrophoretic particles). In this embodiment, the white particles are negatively charged and the black particles are positively charged.

When a relation between the pixel electrode 51 and the opposite electrode 52 is in a state in which the pixel electrode 51 is supplied with an electric potential lower than an electric potential supplied to the opposite electrode 52, the positively charged black particles are attracted toward the pixel electrode 51 and the negatively charged white particles are attracted toward the opposite electrode 52. As a result of this operation, when the pixel circuit P is viewed from a side of the opposite electrode 52 which is the viewing side electrode, a “white color” is recognized.

In contrast, when the relation between the pixel electrode 51 and the opposite electrode 52 is in a state in which the pixel electrode 51 is supplied with an electric potential higher than an electric potential supplied to the opposite electrode 52, the negatively charged white particles are attracted toward the pixel electrode 51 and the positively charged black particles are attracted toward the opposite electrode 52. As a result of this operation, when the pixel circuit P is viewed from the side of the opposite electrode 52 which is the viewing side electrode, a “black color” is recognized.

Through the utilization of this mechanism, it is possible to obtain a display having a desired gray level (i.e., a desired brightness level) by setting a voltage between the pixel electrode 51 and the opposite electrode 52 to a voltage value that causes the electrophoretic particles to be moved and brought into a display state corresponding to the desired gray level.

In addition, when the voltage supply between the pixel electrode 51 and the opposite electrode 52 has been stopped, the Coulomb force does not work anymore and, as a result, the electrophoretic particles come into a stop state due to a viscosity resistance of the solvent. Further, the electrophoretic particles are capable of staying at their respective stopped positions for a long time because of the viscosity resistance of the solvent. That is, the electrophoretic particles have a property (memory property) of being capable of keeping a display state at the time when a predetermined voltage has been supplied between the pixel electrode 51 and the opposite electrode 52 even after the stop of the supply of the predetermined voltage.

As shown in FIG. 2, the pixel electrode 51 is electrically connected to one of nodes of the selection switch Ts. Further, the opposite electrode 52 is kept to a ground electric potential GND (0 volt) by being electrically connected to a power supply line 60 for supplying the ground electric potential GND.

The selection switch Ts is disposed between the pixel electrode 51 and a j-th column data line 34, and controls an electric connection (conduction/non-conduction) therebetween. In the example shown in FIG. 2, the selection switch Ts is an N-channel type transistor (for example, a thin film transistor). The gate of each of n pixel circuits p belonging to an i-th row is electrically connected to an i-th row scanning line 32 in common.

As shown in FIG. 2, the storage capacitor Ch includes an electrode L1 and an electrode L2. The electrode L1 is electrically connected to the pixel electrode 51 and the selection switch Ts; while the electrode L2 is electrically connected to the power supply line 60.

Let us return to the explanation of FIG. 1. The scanning line driving circuit 42 outputs each of scanning signals GW[1] to GW[m] onto a corresponding one of the scanning lines 32. Here, a scanning signal that is output onto an i-th row scanning line 32 is denoted by a GW[i]. When the scanning line driving circuit 42 sets the scanning signal GW[i] to an active level (H level) for a predetermined period, the selection switches Ts, each of which is included in a corresponding one of the n pixel circuits P belonging to the i-th row, is simultaneously changed to ON state. The transition of the scanning signal GW[i] to H level means the selection of the i-th row scanning line 32.

The data line driving circuit 44 generates data signals Vx[1] to Vx[n] each associated with a corresponding one of n pixel circuits P belonging to one row having been selected by the scanning line driving circuit 42, and outputs each of the generated data signals Vx[1] to Vx[n] onto a corresponding one of the data lines 34. Here, a data signal that is output onto a j-th column data line 34 is denoted by a Vx[j].

Here, it is assumed a case where a pixel circuit P that is located at a position corresponding to an intersection of an i-th row and a j-th column is supplied with a data signal Vx. In this case, the data line driving circuit 44 outputs, as the data signal Vx[j], a voltage signal having a magnitude corresponding to a gray level having been assigned to the relevant pixel circuit P onto the j-column data line 34, in synchronization with a timing point when the scanning line driving circuit 42 selects an i-th row scanning line 32. In addition, the gray level having been assigned to the relevant pixel circuit P will be referred to as "an assigned gray level" below.

The relevant data signal Vx[j] is supplied to (written into) the pixel electrode 51 and the storage capacity Ch, which are included in the relevant pixel circuit P, via a corresponding selection switch Ts (refer to FIG. 2) in an ON state. Through this operation, a voltage between both nodes of the electrophoretic element 50 (i.e., a voltage between the pixel electrode 51 and the opposite electrode 52) of the relevant pixel circuit P is set to a voltage value corresponding to the assigned gray level for the relevant pixel circuit P.

In this way, the driving portion 40 selects the i-th row scanning line 32 and further outputs the data signal Vx[j] having a magnitude corresponding to the assigned gray level for the pixel circuit P, which is located at the position corresponding to the intersection of the i-th row and the j-th column, onto the j-column data line 34. This operation is called a writing operation for writing the data signal Vx[j] into the relevant pixel circuit p.

Figure 3:
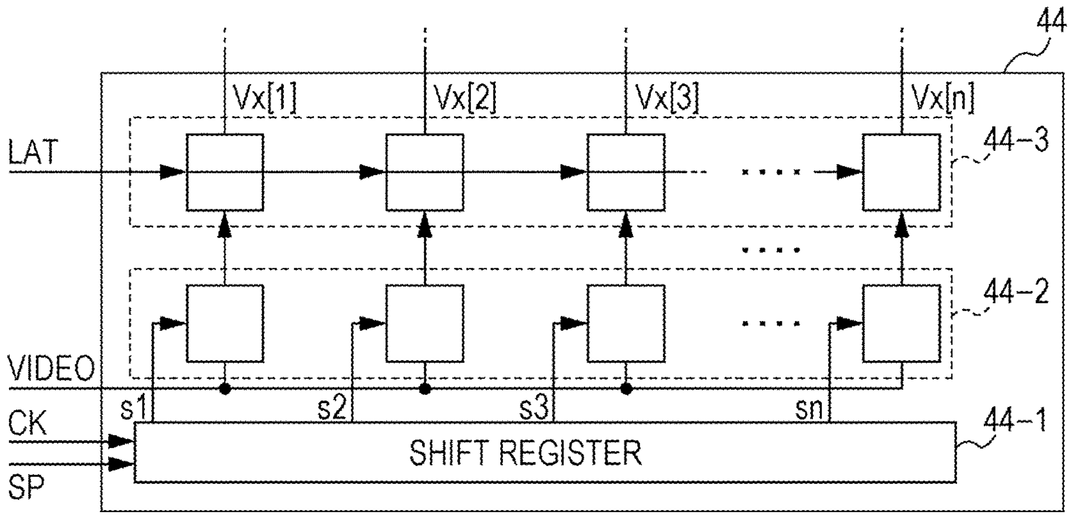
FIG. 3 is a diagram illustrating an example of the configuration of a data line driving circuit according to an embodiment of the invention.

FIG. 3 is a diagram illustrating an example of the configuration of the data line driving circuit 44. As shown in FIG. 3, the data line driving circuit 44 includes a shift register 44-1; a first latch circuit 44-2; and a second latch circuit 44-3.

The shift register 44-1 shifts a start pulse SP in accordance with a clock signal CK supplied from the control circuit 20, and sequentially outputs each of sampling signals s1 to sn from a corresponding one of n stages thereof consisting of a 1st stage thereof corresponding to a 1st column data line 34 up to an n-th stage thereof corresponding to an n-th column data line 34.

Each of n stages of the first latch circuit 44-2 sequentially reads in and outputs a corresponding one of data signals Vx[1] to Vx[n] included in a video signal VIDEO to the second latch circuit 44-3 during a period associated with a sampling signal which is among the sampling signals s1 to sn and which is input to the relevant stage of the first latch circuit 44-2. In addition, the video signal VIDEO is supplied to the first latch circuit 44-2 from the control circuit 20.

Each of n stages of the second latch circuit 44-3 reads in and retains a corresponding one of the data signals Vx[1] to Vx[n], which are included in the video signal VIDEO and each of which is supplied from a corresponding one of the n stages of the first latch circuit 44-2, at a timing point when a corresponding one of sequentially supplied latch pulses LAT becomes an active level. As a result, each of the data signals Vx[1] to Vx[n] is line-sequentially supplied to a corresponding one of the 1st to n-th column data lines 34.

Specifically, under the control of the control circuit 20, during a blanking period after the completion of the reading-in operations by the 1st to n-th stages of the first latch circuit 44-2 for reading in data signals for each row, that is, the data signals Vx[1] to Vx[n] included in the video signal VIDEO, each of the latch pulses LAT is sequentially input to a corresponding one of the n stages of the second latch circuit 44-3 and, synchronously therewith, each of the data signals Vx[1] to Vx[n] is line-sequentially output onto a corresponding one of the 1st to n-th column data lines 34.

Hereinafter, the configuration and operation of the charging switching portion 80 will be described.

Figure 4:
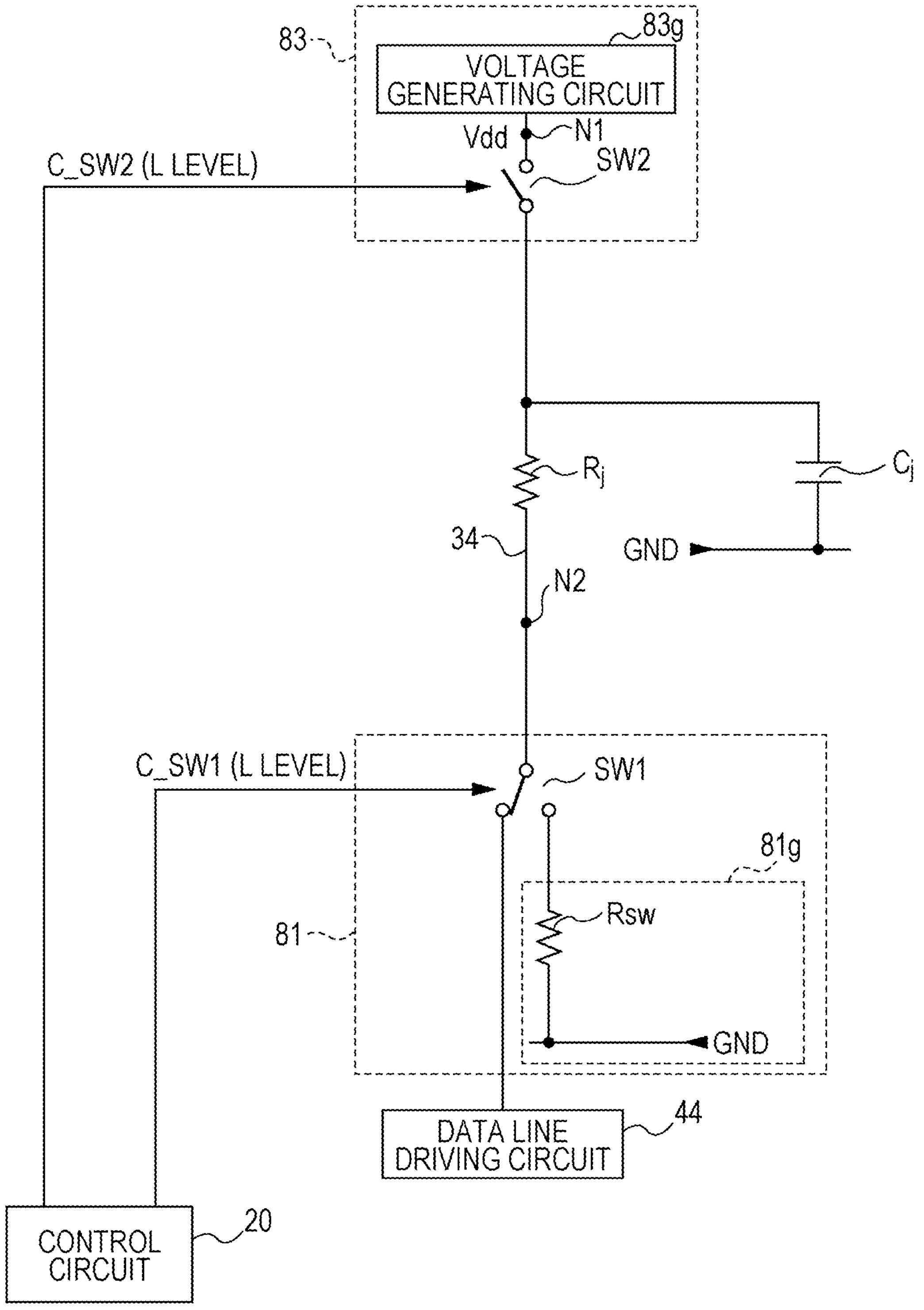
FIG. 4 is a diagram illustrating a first state of an example of the configuration of a charging switching portion according to an embodiment of the invention.
Figure 5:
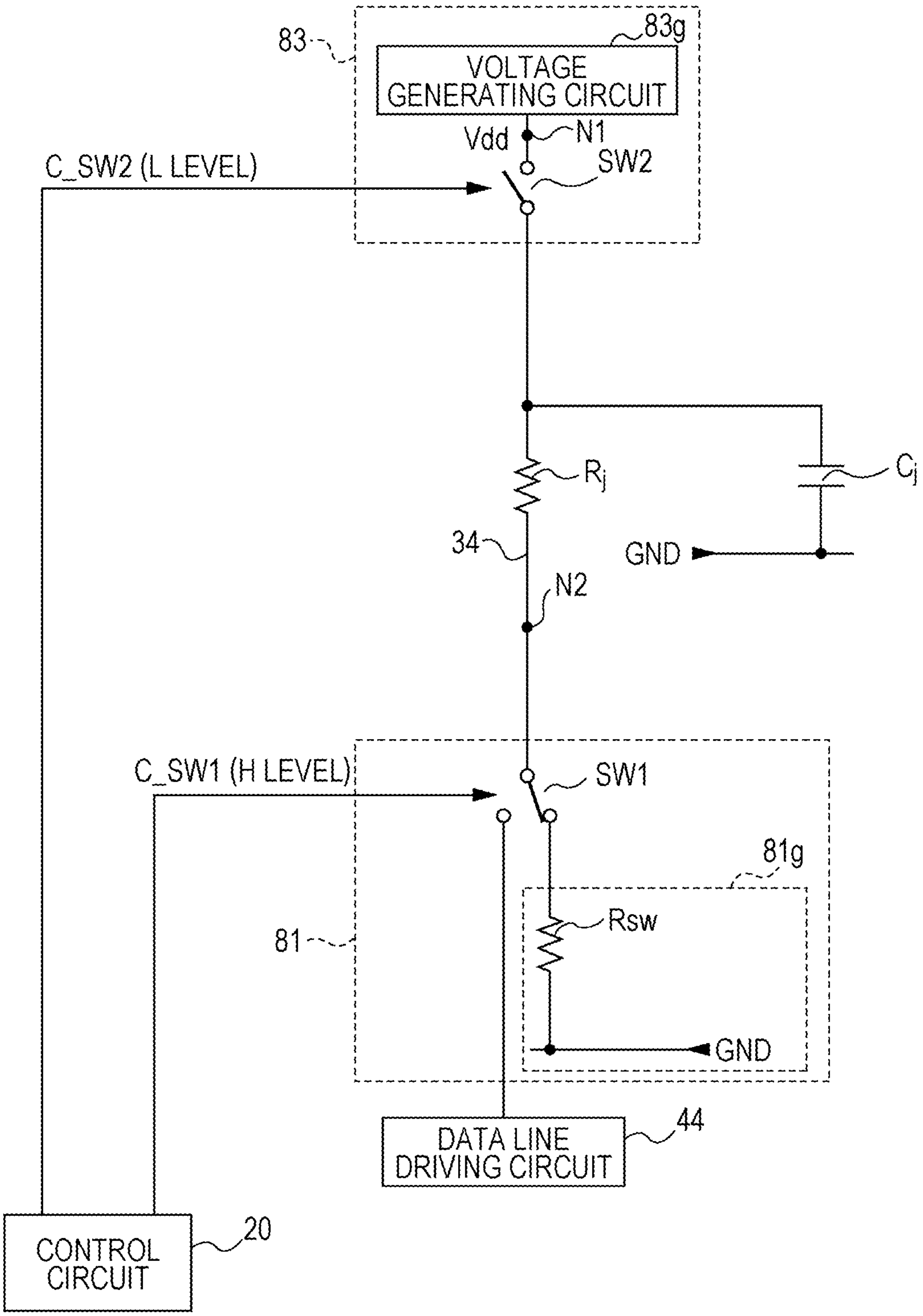
FIG. 5 is a diagram illustrating a second state of an example of the configuration of a charging switching portion according to an embodiment of the invention.
Figure 6:
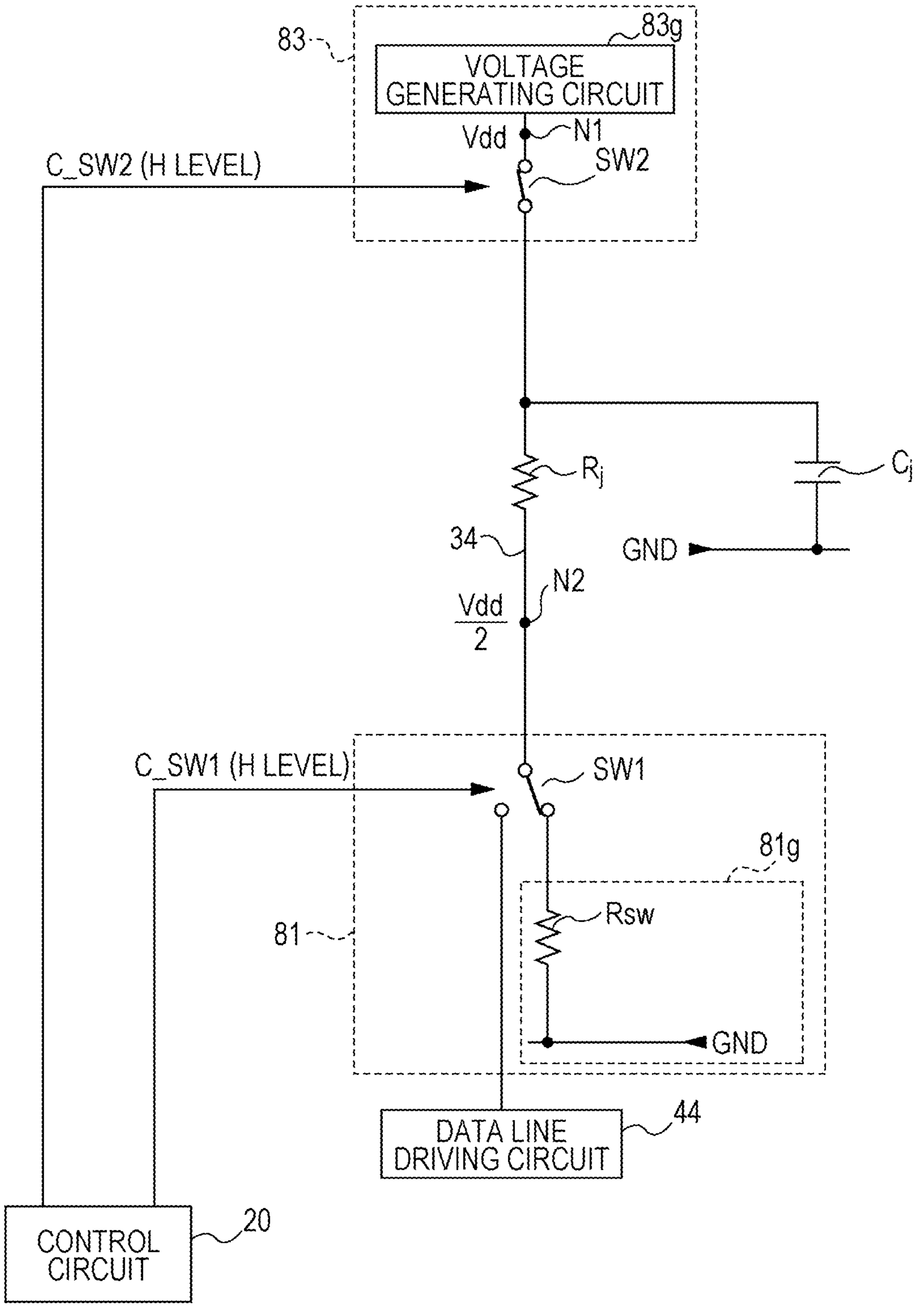
FIG. 6 is a diagram illustrating a third state of an example of the configuration of a charging switching portion according to an embodiment of the invention.

FIGS. 4 to 6 are diagrams each illustrating an example of the configurations of a data line switching circuit 81 and a data line charging circuit (precharge circuit) 83 that are included in the charging switching portion 80. In addition, for the sake of convenience of description, attention is focused on a j-th column data line 34, and the data line switching circuit 81 and the data line charging circuit 83 corresponding thereto will be described below. The data line switching circuit 81 and the data line charging circuit 83 corresponding to each of the other column data lines 34 are configured in the same way.

Figure 7:
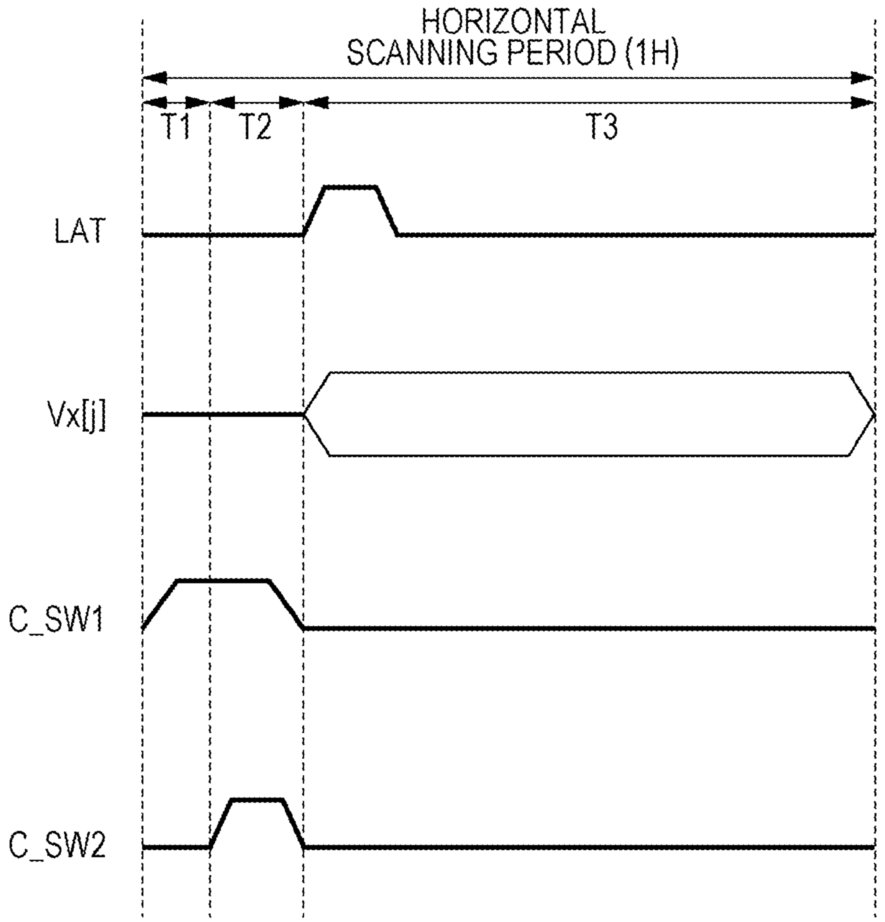
FIG. 7 is a diagram illustrating a timing chart of operation of a charging switching portion according to an embodiment of the invention.

FIG. 7 is a diagram illustrating a time chart of operation timing of the charging switching portion 80. In addition, the operation timing of the charging switching portion 80 is controlled by the control circuit 20.

The data line switching circuit 81 includes an adjustment circuit 81*g* and a first switch SW1 for switching the connection destination of one of the two ends of the relevant data line 34. When an electric potential of the relevant data line 34 is set (charged) to a precharge electric potential at the time of the beginning of a writing period T3 described below, the adjustment circuit 81*g* functions as the above precharge electric potential adjustment portion for adjusting a value of the precharge electric potential.

The first switch SW1 causes the one of the ends of the relevant data line 34 to be electrically connected to the data line driving circuit 44 when a control signal C_SW1 supplied from the control circuit 20 is L-level. Further, the first switch SW1 causes the one of the ends of the relevant data line 34 to be electrically connected to the adjustment circuit 81*g* when the control signal C_SW1 is H-level.

In other words, the first switch SW1 functions as the above first switching portion that electrically connects the first data line portion of the relevant data line 34 to any one of the data line driving circuit 44 and the adjustment circuit 81*g*.

The adjustment circuit 81*g* includes an adjustment resistance Rsw, one of the two nodes thereof being retained to a fixed electric potential (for example, a ground electric potential). The other one of the two nodes of the adjustment resistance Rsw is electrically connected to the first switch SW1. The electric resistance value of the adjustment resistance Rsw will be described in detail below. In addition, the adjustment resistance Rsw may be configured by utilizing, for example, a wiring resistance relating to the adjustment circuit 81*g*.

The data line charging circuit 83 includes a second switch SW2 for switching the connection destination of the other one of the two ends of the relevant data line 34, and a voltage generating circuit 83*g* for outputting a power source electric potential Vdd. The voltage generating circuit 83*g* functions as the above precharge circuit for setting an electric potential of the relevant data line 34 to a precharge electric potential during the charging period T2 prior to the writing period T3 when the relevant data line 34 is supplied with a data signal.

The second SW2 causes the other one of the ends of the relevant data line 34 to be open when a control signal C_SW2 supplied from the control circuit 20 is L level. Further, the second SW2 causes the other one of the ends of the relevant data line 34 to be electrically connected to the output node of the voltage generating circuit 83*g* when the control signal C_SW2 is H level.

In other words, the second switch SW2 functions as the above second switching portion for causing the second data line end portion of the relevant data line 34 to be electrically connected to or disconnected from the voltage generating circuit 83*g*.

In addition, it is not necessary to provide the voltage generating circuit 83*g* in the data line charging circuit 83, and it is enough just to configure such that an electric potential of a node N1 shown in each of FIGS. 4 to 6 becomes equal to the power source electric potential Vdd.

A resistance $R_j$ shown in FIG. 4 is an electric resistance between the both ends of the j-th column data line 34. This resistance $R_j$ is mainly composed of a wiring resistance of the j-th column data line 34 itself, and a wiring resistance of the pixel circuit P that is in a state of being electrically connected to the j-th column data line 34.

A capacitance $C_j$ shown in FIG. 4 is a capacitance between the both ends of the j-th column data line 34. This capacitance $C_j$ is mainly composed of a wiring capacitance of the j-th column data line 34 itself, and a diffusion capacitance of the selection switch Ts included in the pixel circuit P that is in a state of being electrically connected to the j-th column data line 34.

In a state shown in FIG. 4, both of the control signal C_SW1 and the control signal C_SW2 are L levels. Thus, the one of the ends of the relevant data line 34 is electrically connected to the data line driving circuit 44 and, simultaneously therewith, the other one of the ends of the relevant data line 34 is open. This connection state will be referred to as a first state below.

This first state is a state that is established during the writing period T3 of periods T1 to T3 shown in FIG. 7. In addition, a period from the beginning of the period T1 until the end of the period T3 represents one horizontal scanning period (1H). This horizontal scanning period 1H includes a charging preparation period T1; a charging period (precharge period) T2; and the writing period T3.

In a state shown in FIG. 5, the control signal C_SW1 is H level and, simultaneously therewith, the control signal C_SW2 is L level. Thus, the one of the ends of the relevant data line 34 is electrically connected to the adjustment circuit 81*g* and, simultaneously therewith, the other one of the ends of the relevant data line 34 is open. This connection state will be referred to as a second state below.

This second state is a state that is established during the charging preparation period T1 of the periods T1 to T3 shown in FIG. 7. In this second state, the data line driving circuit 44 is electrically disconnected from the relevant data line 34, and thus, even if there occurs, for example, a case where the power source electric potential Vdd is supplied to the other one of the ends of the relevant data line 34, it is possible to reliably prevent the occurrence of a situation in which a so-called penetration current flows into the data line driving circuit 44.

In a state shown in FIG. 6, both of the control signal C_SW1 and the control signal C_SW2 are H levels. Thus, the one of the ends of the relevant data line 34 is electrically connected to the adjustment circuit 81*g* and, simultaneously therewith, the other one of the ends of the relevant data line 34 is electrically connected to a supply line for supplying the power source electric potential Vdd. This connection state will be referred to as a third state below. This third state is a state that is established during the charging period T2 of the periods T1 to T3 shown in FIG. 7.

That is, the control circuit 20 performs control such that the second switch SW2 causes the other one of the ends of the relevant data line 34 to be electrically connected to the voltage generating circuit 83*g* and then causes the precharge to be started, after the operation during the charging preparation period T1 (in other words, after having controlled such that the first switch SW1 causes the one of the ends of the relevant data line 34 to be electrically connected to the adjustment circuit 81*g*).

This transition to the charging period T2 after the operation of the charging preparation period T1 allows the power source electric potential Vdd to be supplied to the other one of the ends of the relevant data line 34 after the disconnection of the relevant data line 34 from the data line driving circuit 44. This operation makes it possible to reliably prevent the flow of a so-called penetration current into the data line driving circuit 44 and thereafter set (charge) an electric potential of the relevant data line 34 at the time of the beginning of the writing period T3 to a precharge electric potential. Moreover, since the charge of the precharge electric potential is performed in the state where the one of the ends of the relevant data line 34 is electrically connected to the adjustment circuit 81*g*, the precharge electric potential becomes more stable, as compared with a case where the charge of the precharge electric potential is performed in a state where the one of the ends of the relevant data line 34 is open.

Specifically, when the electric potential of a node N2 shown each of FIGS. 4 to 6 is denoted by $V_{N2}$, the electric potential $V_{N2}$ in the third state can be represented by a formula described blow (Formula 1) by using Ohm's low.

$$V_{N2} Vdd \cdot RSW/(R_j+Rsw) \quad \text{(Formula 1)}$$

Here, for example, the adjustment resistance Rsw is set such that a value of the electric potential $V_{N2}$ at the time of the beginning of the third state (i.e., a precharge electric potential) becomes (Vdd/2). This is a setting in view of a common method in which, when a power source voltage is denoted by Vdd, a threshold value of a driving voltage for driving a pixel is set to (Vdd/2). In addition, the value of the adjustment resistance Rsw is not limited to (Vdd/2), but may be suitably optimized on the basis of a requirement for a target apparatus.

Hereinafter, advantageous effects brought about by setting the electric potential of the relevant data line 34 at the time of the beginning of the writing period T3 to a precharge electric potential (for example, Vdd/2) will be described.

Figure 8:
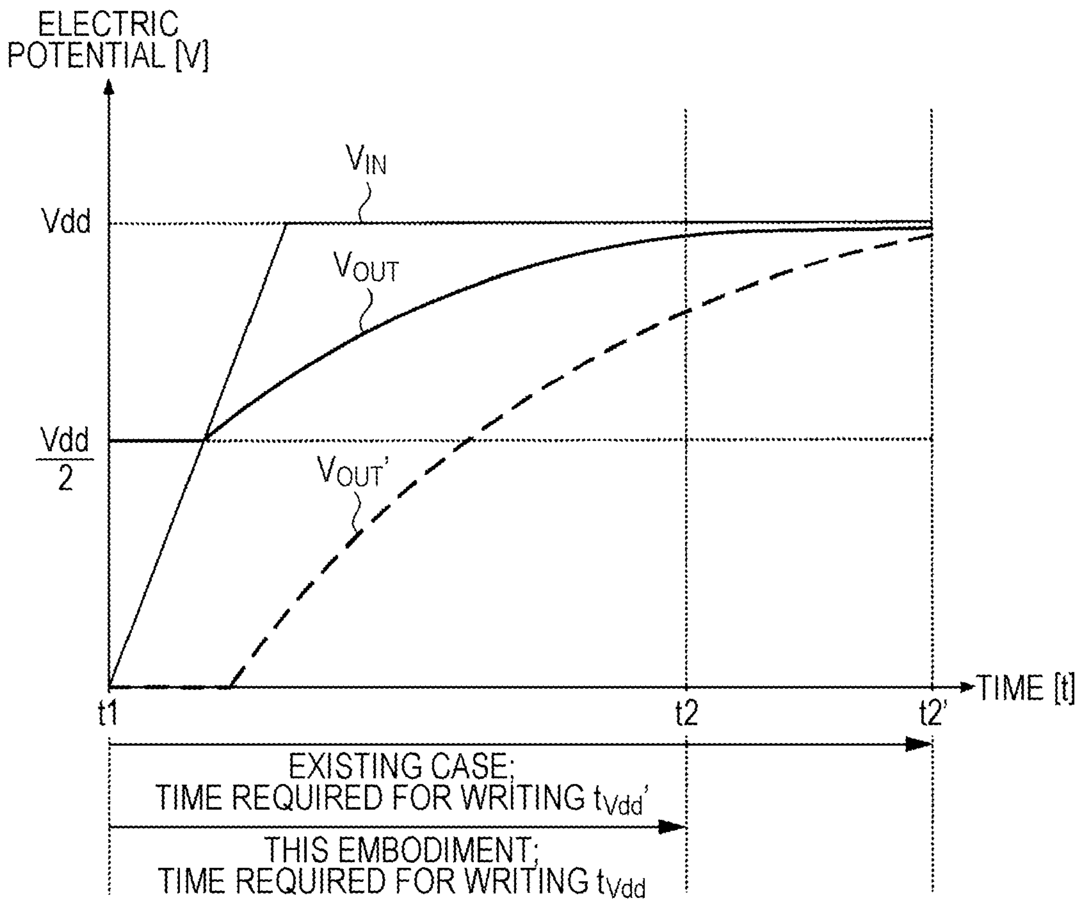
FIG. 8 is a diagram illustrating temporal changes of an electric potential of a data signal that is output onto a data line from a data line driving circuit and an electric potential of a pixel electrode.

FIG. 8 is a diagram illustrating temporal changes of an electric potential of the data signals Vx[1] to Vx[n] (hereinafter referred to as an input electric potential $V_{IN}$) which are each supplied to a corresponding one of the data lines 34 from the data line driving circuit 44 and an electric potential of a corresponding one of the pixel electrodes 51 (hereinafter referred to as an output electric potential $V_{OUT}$). In addition, in FIG. 8, an electric potential denoted by $V_{OUT}'$ represents an output electric potential in the case of an existing electrophoretic display apparatus.

In the case of the existing electrophoretic display apparatus, as shown in FIG. 8, the charging of a pixel electrode is started from 0 [volt] and is gradually progressed, and thus, a time $t_{Vdd}'$ is required from a time point t1 when the supply of the input electric potential $V_{IN}$ is started until a time point t2' when the electric potential of the relevant pixel electrode (the output electric potential $V_{OUT}'$) asymptotically reaches the power source electric potential Vdd.

On the other hand, in the case of the electrophoretic display apparatus 100 according to this embodiment, the electric potential of the relevant pixel electrode 51 is equal to Vdd/2 [volt] at the time point t1 when the supply of the input electric potential $V_{IN}$ is started, and thus, a time $t_{Vdd}$ required from the time point t1 until a time point t2 when the electric potential of the relevant pixel electrode 51 (the output electric potential $V_{OUT}$) asymptotically reaches the power source electric potential Vdd is shorter than the time $t_{Vdd}'$, as shown in FIG. 8.

In addition, one of causes that cause a delay between the time point t1 when the supply of each of the data signals Vx[1] to Vx[n] to a corresponding one of the data lines 34 from the data line driving circuit 44 is started and the time point t2 when, actually, the electric potential of the relevant pixel electrode 51 asymptotically reaches the power source electric potential Vdd is a wiring resistance $R_j$ (corresponding to the above-described electric resistance $R_j$) and a parasitic capacitance $C_j$ (corresponding to the above-described capacitance $C_j$) of the relevant data line 34.

That is, the wiring resistance $R_j$ and the parasitic capacitance $C_j$ of each of the data lines 34 are one of causes that cause a delay of a time required to complete the writing of a corresponding one of the data voltages Vx[n] to Vx[n] into a corresponding one of the pixel electrodes 51. Further, this delay of the time required to complete the writing leads to the increase of power consumption of the data line driving circuit 44.

In this respect, the electrophoretic display apparatus 100 according to this embodiment is configured such that, as described above, for each of the data lines 34, the charging preparation period T1 and the charging period T2 are provided in series immediately before the writing periods T3. Further, this configuration enables reliable prevention of the flow of a penetration current into the data line driving circuit 44 and a stable and prompt setting of an electric potential of the relevant data line 34 at the time of the beginning of the writing period T3 to a precharge electric potential (for example, Vdd/2); and simultaneously therewith, the configuration enables realization of shortening of a time required to complete the writing of a data signal into a corresponding pixel electrode 51 and, as a result thereof, realization of a reduction of the power consumption of the data line driving circuit 44.

Incidentally, through the above detailed explanation for the embodiment according to the invention, those skilled in the art could easily understand that lots of modifications that do not substantially depart from the new items and the advantageous effects of the invention can be made (naturally, all of such modifications being encompassed within the scope of the invention). For example, any term that is written at least once together with a different term having a broader or synonymous meaning in this patent description and the accompanying drawings can be replaced by the different term in any portion of this patent description and the accompanying drawings. Further, the configuration and operation of the electrophoretic display apparatus 100 are also not limited to those of the aforementioned embodiment, but can be variously modified and practiced.

Hereinafter, some modification examples of the aforementioned embodiment will be described. In order to avoid repetitions of similar descriptions, only points that are different from those of the aforementioned embodiment will be described and descriptions relating to configurations and the like that are common to those of the aforementioned embodiment will be omitted.

First Modification Example

In the aforementioned embodiment, the adjustment resistance Rsw included in the adjustment circuit 81*g* may be configured by utilizing, not the wiring resistance, but an active element set including active elements. For example, the adjustment resistance Rsw may be constituted by utilizing a so-called on-resistance of each of an N-type transistor and a P-type transistor that are active elements.

Figure 9:
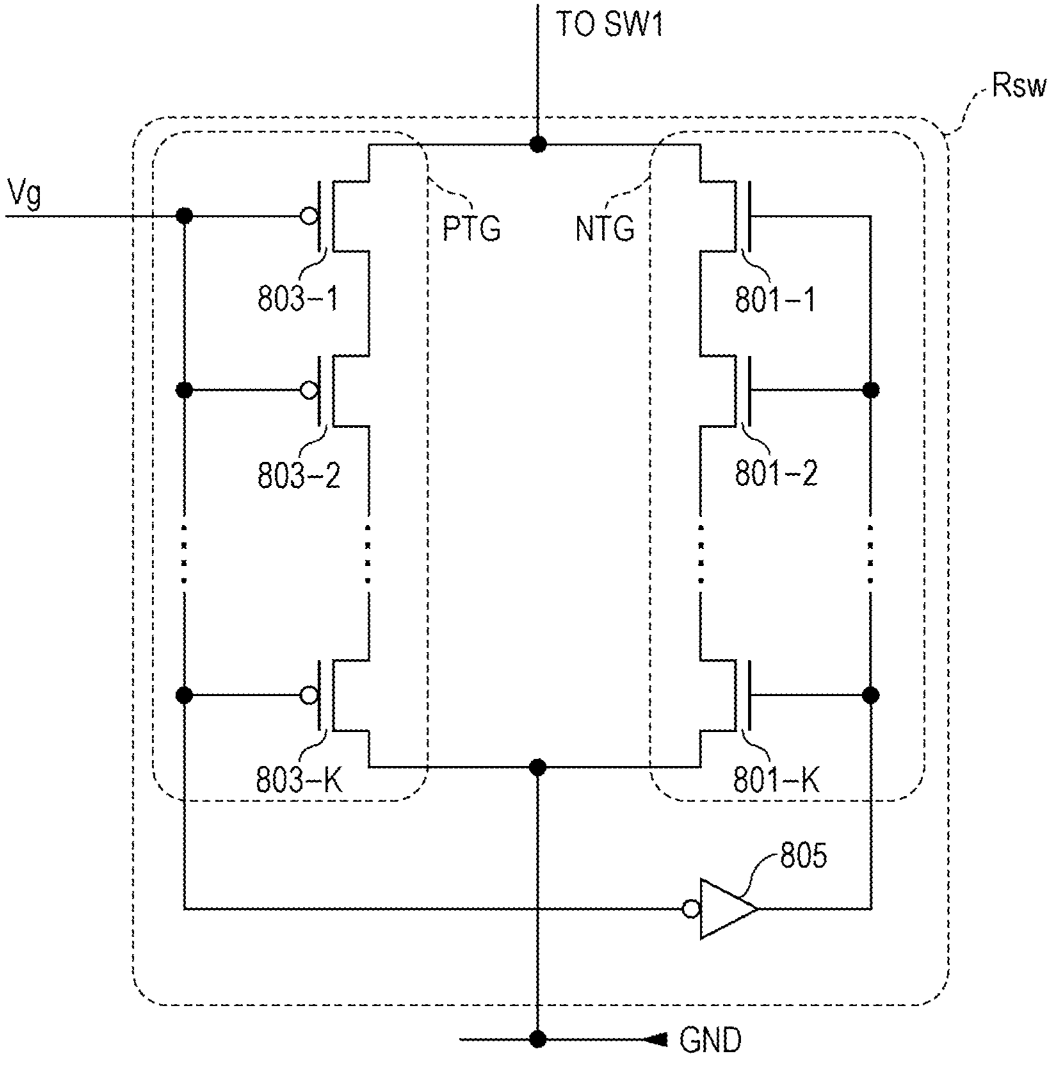
FIG. 9 is a diagram illustrating an example of the configuration of an adjustment resistance according to an embodiment of the invention.

FIG. 9 illustrates a configuration of the adjustment resistance Rsw that is constituted by an active element set, which includes an N-type transistor set NTG composed of a plurality of N-type transistors 801-1 to 801-K that are mutually electrically connected in series; a P-type transistor set PTG composed of a plurality of P-type transistors 803-1 to 803-K that are mutually electrically connected in series (K being a natural number larger than or equal to "2"); and an inverter circuit 805 that polarity-inverts a signal. Here, the N-type transistor set NTG and the P-type transistor set PTG are electrically connected in parallel to each other.

Further, the gates of the plurality of N-type transistors 801-1 to 801-K are electrically connected to one another, and the gates of the plurality of P-type transistors 803-1 to 803-K are also electrically connected to one another.

Moreover, the gates of the plurality of N-type transistors 801-1 to 801-K are electrically connected to the gates of the plurality of P-type transistors 803-1 to 803-K via the inverter circuit 805.

Through the above configuration, when a gate electric potential Vg is supplied to the gates of the plurality of N-type transistors 801-1 to 801-K, a gate electric potential (−Vg) is, simultaneously therewith, supplied to the gates of the plurality of P-type transistors 803-1 to 803-K.

It possible to reduce the area of a region related to the adjustment resistance Rsw (i.e., a region targeted for patterning therefor) by, as shown in the above modification example, constituting the adjustment resistance Rsw by using an active element set including active elements. Further, it is possible to make the value of the adjustment resistance Rsw variable by constituting the adjustment resistance Rsw by using a plurality of such active element sets and setting, for each of the active element sets, all transistors included in the relevant active element set to ON or OFF state (the all transistors included in the relevant active element set being associated with the N-type transistors 801-1 to 801-K and the P-type transistors 803-1 to 803-K in the example shown in FIG. 9).

Second Modification Example

The adjustment resistance Rsw included in the adjustment circuit 81*g* may be constituted by a ladder resistance whose electric resistance value can be switched to any one of settable values. This configuration makes it possible to switch the electric potential $V_{N2}$ (the precharge electric potential) of the node N2 in the third state to any desired one of settable values.

Third Modification Example

In each of the aforementioned first and modification examples, the control circuit 20 may be also used as a resistance value changing portion for changing the electric resistance value of the adjustment resistance Rsw. For example, in the first modification example, the configuration may be modified such that the gate electric potential Vg is supplied to the adjustment resistance Rsw under the control of the control circuit 20. Further, in the second modification example, the configuration may be modified such that switches for switching the electric resistance value of the adjustment resistance Rsw constituted by the ladder resistance are controlled by the control circuit 20. In addition, the resistance value changing portion may be provided separately from the control circuit 20.

Application Examples

Hereinafter, electronic devices to which the invention is applied will be exemplified. In each of FIGS. 10 and 11, an external view of an electronic device employing the electrophoretic display apparatus 100 having been exemplified above is illustrated.

Figure 10:
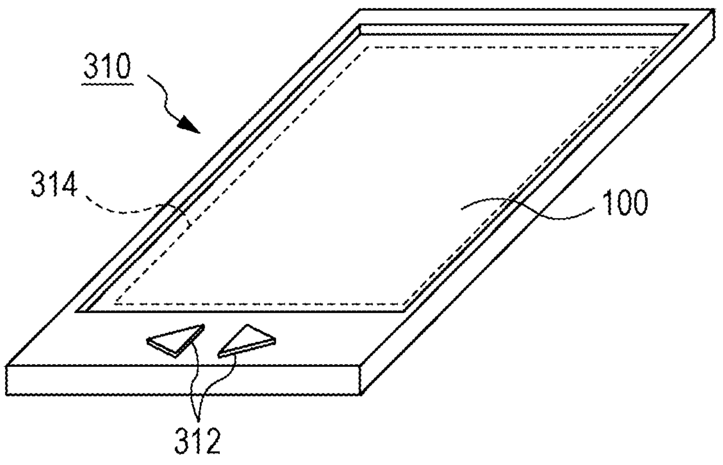
FIG. 10 is a perspective view of an electronic device (information terminal) according to another embodiment of the invention.

FIG. 10 is a perspective view of a portable type information terminal (an electronic book) 310 utilizing the electrophoretic display apparatus 100. As shown in FIG. 10, the information terminal 310 is configured to include operation elements 312 and the electrophoretic display apparatus 100 for displaying images on a display portion 314. When any one of the operation elements 312 is operated, an image displayed on the display portion 314 is updated.

Figure 11:
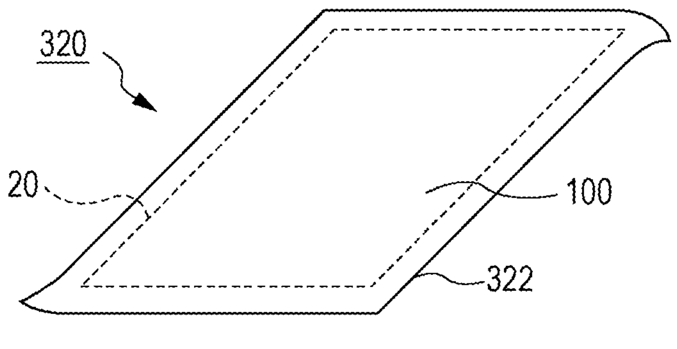
FIG. 11 is a perspective view of an electronic device (electronic paper) according to another embodiment of the invention.

FIG. 11 is a perspective view of electronic paper 320 utilizing the electrophoretic display apparatus 100. As shown in FIG. 11, the electronic paper 320 is configured to include the electrophoretic display apparatus 100 that is formed on the surface of a flexible substrate (sheet) 322.

Electronic devices to which the invention is applied are not limited to the above exemplifications. For example, it is possible to employ the electrophoretic display apparatus according to the invention in various electronic devices, such as a mobile telephone, a watch (wrist watch), a portable type sound reproduction device, an electronic organizer, and a touch-panel integrated type display device.

The entire disclosure of Japanese Patent Application No.2014-216698, filed Oct. 23, 2014 is expressly incorporated by reference herein.

What is claimed is:

1. An electrophoretic display apparatus comprising;

a scanning line;

a data line that intersects the scanning line;

a pixel which is provided so as to correspond to an intersection of the scanning line and the data line, the pixel comprising:

a first electrode;

a second electrode; and an electrophoretic particle interposed between the first electrode and the second electrode;

a data line driving circuit that outputs a data signal to the data line;

a precharge circuit that sets an electric potential of the data line to a precharge electric potential;

a precharge electric potential adjustment circuit that adjusts a value of the precharge electric potential;

a first switch that causes a first data line end portion of the data line to be electrically connected to one of the data line driving circuit and the precharge electric potential adjustment circuit a second switch that causes a second data line end portion of the data line to be electrically connected to or disconnected from the precharge circuit; and a control circuit that performs control such that the first switch causes the first data line end portion of the data line to be electrically connected to the precharge electric potential adjustment circuit, and subsequently allows starting of a precharge operation by performing control such that the second switch causes the second data line end portion of the data line to be electrically connected to the precharge circuit.

2. The electrophoretic display apparatus according to claim 1, wherein the precharge electric potential adjustment circuit includes a resistance, one end of the resistance being electrically connected to the first switch, and another end of the resistance being kept at a fixed electric potential.

3. The electrophoretic display apparatus according to claim 2, wherein the resistance includes at least one active element set each including a P-type transistor set including a plurality of P-type transistors that are mutually electrically connected in series and an N-type transistor set including a plurality of N-type transistors that are mutually electrically connected in series, a total number of the P-type transistors and a total number of the N-type transistors being the same and being larger than or equal to two, the P-type transistor set and the N-type transistor set being electrically connected in parallel to each other.

4. An electronic device comprising a portable information terminal, an electronic paper device, a mobile telephone, a watch, a portable sound reproduction device, an electronic organizer, or a touch-panel display device, the electronic device including the electrophoretic display apparatus according to claim 3.

5. The electrophoretic display apparatus according to claim 2, wherein the resistance is a ladder resistance.

6. An electronic device comprising a portable information terminal, an electronic paper device, a mobile telephone, a watch, a portable sound reproduction device, an electronic organizer, or a touch-panel display device, the electronic device including the electrophoretic display apparatus according to claim 5.

7. The electrophoretic display apparatus according to claim 2, further comprising a resistance value changing circuit that changes an electric resistance value of the resistance.

8. An electronic device comprising a portable information terminal, an electronic paper device, a mobile telephone, a watch, a portable sound reproduction device, an electronic organizer, or a touch-panel display device, the electronic device including the electrophoretic display apparatus according to claim 7.

9. An electronic device comprising a portable information terminal, an electronic paper device, a mobile telephone, a watch, a portable sound reproduction device, an electronic organizer, or a touch-panel display device, the electronic device including the electrophoretic display apparatus according to claim 2.

10. An electronic device comprising a portable information terminal, an electronic paper device, a mobile telephone, a watch, a portable sound reproduction device, an electronic organizer, or a touch-panel display device, the electronic device including the electrophoretic display apparatus according to claim 1.

* * * * *